United States Patent
Rajagopalan

(10) Patent No.: US 6,613,842 B2
(45) Date of Patent: Sep. 2, 2003

(54) METHOD OF IMPROVING IMPACT RESISTANCE IN GOLF BALL CORE FORMULATIONS

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 77 days.

(21) Appl. No.: 10/037,381

(22) Filed: Oct. 23, 2001

(65) Prior Publication Data

US 2002/0086745 A1 Jul. 4, 2002

Related U.S. Application Data

(63) Continuation-in-part of application No. 09/259,879, filed on Mar. 1, 1999, now Pat. No. 6,306,049.

(51) Int. Cl.$^7$ .......................... C08L 9/00; A63B 37/06
(52) U.S. Cl. ..................... 525/193; 525/274; 473/354; 473/357; 473/372; 473/373; 473/374; 473/377
(58) Field of Search ................... 525/193, 274; 473/354, 357, 372, 373, 374, 377

(56) References Cited

U.S. PATENT DOCUMENTS 4,141,559 A * 2/1979 Melvin
6,361,453 B1 * 3/2002 Nakamura

FOREIGN PATENT DOCUMENTS

JP   2000-051402   * 2/2000

* cited by examiner

Primary Examiner—David J. Buttner
(74) Attorney, Agent, or Firm—William B. Lacy

(57) ABSTRACT

A golf ball comprising a core and a cover, the cover having a thickness of less than about 0.08 inches, the core having a compression of less than about 90 and is formed from a composition comprising a base rubber, a metal salt acrylate or diacrylate, an initiator, a highly-neutralized polymer, and at least one of a low modulus ionomer or an acid terpolymer of the formula:

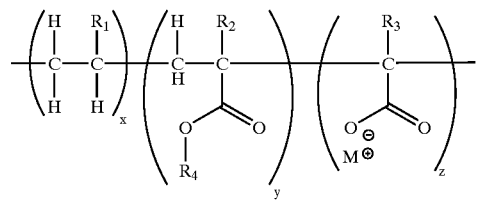

having a dynamic shear storage modulus at 23° C. of at least about $10^4$ dynes/cm$^2$ and a loss tangent of no more than about 1 at a frequency of about 1 Hz, wherein $R_1$, $R_2$, and $R_3$ are hydrogen or $CH_3$; $R_4$ is linear or branched alkyl of formula $C_nH_{2n+1}$, where n is an integer; $M^+$ is $H^+$, $Li^+$, $Zn^{2+}$, $Ca^{2+}$, $Ti^{2+}$, $Mg^{2+}$, $Na^+$, $W^{3+}$, or $Zr^{2+}$; and x ranges from about 20 to about 85 weight percent of the polymer, y ranges from about 1 to about 50 weight percent of the polymer, and z ranges from about 1 to about 30 weight percent of the polymer; wherein the low modulus ionomer or acid terpolymer is present in an amount sufficient to improve the durability of the core.

25 Claims, No Drawings

METHOD OF IMPROVING IMPACT RESISTANCE IN GOLF BALL CORE FORMULATIONS

CROSS-REFERENCE TO RELATED APPLICATIONS

This application is a continuation-in-part of U.S. application Ser. No. 09/259,879, filed Mar. 1, 1999, now U.S. Pat. No. 6,306,049 which is incorporated herein, in its entirety, by express reference thereto.

FIELD OF INVENTION

The present invention is directed toward novel golf ball core compositions and golf balls comprising such compositions, and to a method for forming golf balls containing such core compositions, particularly golf balls having dual cores. Golf balls of the invention have at least one core layer comprising at least one Low Modulus Ionomer ("LMI") or corresponding acid terpolymer and a highly-neutralized polymer.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer. Therefore, most amateur golfers typically prefer a solid, two-piece ball with an ionomer cover, which provides a combination of distance and durability. Because of the hard ionomer cover, these balls are almost impossible to cut, but also have a very hard "feel," which many golfers find unacceptable, and a lower spin rate, making these balls more difficult to draw or fade. The differences in the spin rate can be attributed to the differences in the composition and construction of both the cover and the core.

Recently, multilayer golf balls have become available, in an effort to overcome some of the undesirable aspects of conventional two-piece balls, such as their hard feel, while maintaining the positive attributes of these balls such as their increased initial velocity and distance. Multilayer golf balls typically comprise at least one of multiple core layers, a single or multiple intermediate or mantle layer, and/or multiple cover layers. Ideally, multilayer balls have "feel" and spin characteristics approaching those of wound balls. However, the use of at least one mantle or intermediate layer or of multiple core layers has, in some cases, adversely affected the durability of the core.

A number of elastomers such as polybutadiene, natural rubber, styrene butadiene rubber, and isoprene rubber, have been used in the manufacture of golf ball cores. However, golf ball cores are now predominantly made from compositions comprising polybutadiene. In order to obtain the desired physical properties for golf balls, manufacturers have added cross-linking agents, such as metallic salts of an unsaturated carboxylic acid to the polybutadiene, typically in an amount of about 20 to 50 pph of polybutadiene. Typically, either zinc diacrylate or zinc dimethacrylate is used as the cross-linking agent, with zinc diacrylate providing a higher initial velocity than zinc dimethacrylate.

Typically, about 5 to 50 pph of zinc oxide ("ZnO") is also added to the composition, as both a filler and an activation agent for the zinc diacrylate/peroxide cure system. The zinc diacrylate/peroxide cure system, which is well known in the art, cross-links the polybutadiene during the core molding process. In addition to acting as an activation agent, zinc oxide has a high specific gravity (5.6 g/cm$^3$) that allows the weight of the golf ball to be adjusted.

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the United States Golf Association ("USGA") test that approach the USGA maximum of 250 ft/s plus 2 percent test tolerance or total of 255 ft/s as closely as possible.

To meet the needs of golfers having varying levels of skill and swing speeds, golf ball manufacturers frequently vary the compression of the ball, which is a measurement of the deformation of a golf ball or core in inches under a fixed load. Often, to maximize the initial velocity of a golf ball, the hardness of the core has been increased, which increases the compression of the golf ball. However, in general, the results of durability tests show that hard cores, particularly hard outer cores in dual core golf balls, are less durable than softer cores. Attempts to improve the durability of hard cores by the addition of impact modifiers, such as copolymers of ethylene and glycidyl acrylate, to standard core compositions have resulted in golf balls having a reduced initial velocity, thereby adversely affecting the overall performance of the ball.

Therefore, a need remains for a golf ball core composition containing an impact modifier that provides a golf ball core having improved toughness and impact strength with the initial velocity of prior art golf ball cores that lack an impact modifier. The present invention provides such a core composition for golf balls.

SUMMARY OF THE INVENTION

The present invention is directed to a golf ball comprising a core and a cover, the cover having a thickness of less than about 0.08 inches, the core having a compression of less than about 90 and is formed from a composition comprising a base rubber, a metal salt acrylate or diacrylate, an initiator, a highly-neutralized polymer, and at least one of a low modulus ionomer or an acid terpolymer of the formula:

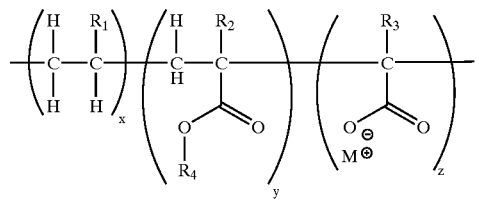

having a dynamic shear storage modulus at 23° C. of at least about 104 dynes/cm$^2$ and a loss tangent of no more than about 1 at a frequency of about 1 Hz, wherein $R_1$, $R_2$, and $R_3$ are hydrogen or $CH_3$; $R_4$ is linear or branched alkyl of formula $C_nH_{2n+1}$, where n is an integer; $M^+$ is $H^+$, $Li^+$, $Zn^{2+}$, $Ca^{2+}$, $Ti^{2+}$, $Mg^{2+}$, $Na^+$, $W^{3+}$, or $Zr^{2+}$; and x ranges from about 20 to about 85 weight percent of the polymer, y ranges from about 1 to about 50 weight percent of the polymer, and z ranges from about 1 to about 30 weight percent of the polymer; wherein the low modulus ionomer or acid terpolymer is present in an amount sufficient to improve the durability of the core.

In one embodiment, the cover has a thickness between about 0.02 to about 0.08 inches but the cover may have a thickness between about 0.02 inches and about 0.05 inches. The highly-neutralized polymer includes ionomeric copolymers and terpolymers, ionomer precursors, thermoplastics, polyamides, polycarbonates, polyesters, polyurethanes, polyureas, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof.

In a preferred embodiment, the highly-neutralized polymer comprises an E/X/Y copolymers where E is ethylene, X is an $\alpha,\beta$-ethylenically unsaturated carboxylic acid, and Y is a softening comonomer. X can be acrylic or methacrylic acid and Y can be a $C_{1-8}$ alkyl acrylate or methacrylate ester. X is typically present in an amount from about 1 to about 35 weight percent of the polymer and Y is typically present in an amount from about 0 to about 50 weight percent of the polymer. X can be present in an amount from about 5 to about 30 weight percent of the polymer and Y can be present in an amount from about 5 to about 25 weight percent of the polymer. Ideally, X is present in an amount from about 10 to about 20 weight percent of the polymer and Y is present in an amount from about 10 to about 20 weight percent of the polymer.

The golf ball may further include an intermediate layer disposed between the core and the cover and, if so, the intermediate layer may include a tensioned elastomeric material. In one embodiment, the core comprises an outer core layer formed of the core composition.

The low modulus ionomer or acid terpolymer present in the core blend is preferably in an amount of up to about 50 pph based on the weight of the elastomer. The low modulus ionomer or acid terpolymer has a flexural modulus of from about 500 to about 35,000 psi and a material hardness of from about 40 Shore A to about 40 Shore D and, if desired, the low modulus ionomer or acid terpolymer is present in the blend in an amount of about 5 to about 45 pph based on the weight of the of elastomer. In a preferred embodiment, the low modulus ionomer or acid terpolymer comprises monomeric units of an $\alpha$-olefin, a softening agent, and an $\alpha,\beta$-unsaturated carboxylic acid at least partially neutralized by at least one metal ion. Preferably, the softening agent is an acrylate class ester and/or the acrylate class ester is at least one of methyl acrylate, n-butyl-acrylate, or iso-butyl-acrylate.

The base rubber can be cis-polybutadiene, trans-polybutadiene, cis-polyisoprene, trans-polyisoprene, or a blend thereof. The core has an Atti compression of between about 50 and about 90. In an alternative embodiment, the core has an Atti compression of less than about 50. In one construction, the core includes a center and at least one core layer, and wherein the center is fluid-filled, solid, or hollow. Additionally, the cover may include an inner cover layer and an outer cover layer.

The highly-neutralized polymer is neutralized with a metal cation, generally including Li, Na, Mg, Zn, Ca, and mixtures thereof.

DEFINITIONS

A "cover" and/or a "core," as these terms are used herein, may be formed from a single layer or from two or more layers, and, thus, each may comprise one or a plurality of layers.

As used herein, a "core comprising a single layer" refers to a unitary or one-piece core, and the layer includes the entire core from the center of the core to its outer periphery. A core, whether formed from a single layer or from two or more layers, may serve as a center for a wound ball.

As used herein, an "intermediate layer" is a layer interposed between a cover and a core of a golf ball. An intermediate layer may be distinguished from a cover and/or a core by some difference in the materials comprising the layers. An intermediate layer may, for example, have a distinct composition, a different proportion of components, a different molecular weight of a component, a different molecular weight distribution of a component, or a different degree of curing or cross-linking when compared to the corresponding attribute of the component comprising the cover or core layers. An intermediate layer may be incorporated, for example, with a single layer or multilayer cover, with a single layer or multilayer core, with both a single layer cover and core, or with both a multilayer cover and a multilayer core.

As used herein, the term "polymer" means any type of polymer including, for example, random polymers and block co- and ter-polymers.

As used herein, the terms "Low Modulus Ionomer" and "LMI" refer to terpolymers of an $\alpha$-olefin, such as ethylene, a softening agent, such as methyl acrylate or iso-butyl-acrylate, and an $\alpha,\beta$-unsaturated carboxylic acid, such as acrylic or methacrylic acid, where at least part of the acid groups are neutralized by metal atoms, such as, but not limited to, sodium, zinc, magnesium, or lithium. Low modulus ionomers are disclosed in U.S. Pat. No. 4,801,649 to Statz, the contents of which are incorporated herein in their entirety by reference.

As used herein, the terms "Low Modulus Ionomer acid terpolymer," "LMI acid terpolymer," and "acid terpolymer" of a Low Modulus Ionomer or LMI refer to terpolymers of an $\alpha$-olefin, such as ethylene, a softening agent, such as methyl acrylate, or iso-butyl-acrylate, and an $\alpha,\beta$-unsaturated carboxylic acid, such as acrylic or methacrylic acid, where the acid groups have not been neutralized by metal atoms.

DETAILED DESCRIPTION OF THE INVENTION

The present invention is directed to golf ball core compositions for forming golf balls comprising a cover and a core and, optionally, an intermediate layer situated between the cover and the core. The golf ball cores of the present invention may comprise a variety of constructions. For example, the core may comprise a single layer or a plurality of layers and/or the cover may include, for example, at least one inner and outer cover layer(s). The core may also comprise a layer formed of a tensioned elastomeric material which is also suitable as an intermediate layer. Preferably, the core composition of the invention is used to form an outer layer of a golf ball core.

The golf ball core compositions of the invention comprise at least one low modulus ionomer or acid terpolymer as an impact and a highly-neutralized polymer ("HNP"). In particular, the addition of at least one low modulus ionomer or acid terpolymer to conventional core compositions is believed to significantly improve the impact durability of a golf ball due to an increase in the toughness and impact strength of the core of the finished golf ball without adversely affecting the initial velocity of the ball.

Low modulus ionomers and Low Modulus Ionomer acid terpolymers useful in the invention are typically terpolymers of the formula:

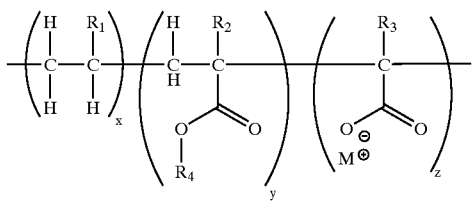

wherein $R_1$, $R_2$, and $R_3$ are hydrogen or $CH_3$; $R_4$ is linear or branched alkyl of formula $C_nH_{2n+1}$, where n is an integer of from 1 to about 20, such as $CH_3$, $C_2H_5$, $C_3H_7$, $C_4H_9$, and $C_5H_{11}$; M+ is $H^+$, $Li^+$, $Zn^{2+}$, $Ca^{2+}$, $W^{3+}$, or $Zr^{2+}$; and x ranges from about 20 to about 85 weight percent of the polymer, y ranges from about 1 to about 50 weight percent of the polymer, and z ranges from about 1 to about 30 weight percent of the polymer. As will be readily understood by one of ordinary skill in the art, when $M^+$ is $H^+$, a terpolymer of the formula above will be an LMI acid terpolymer, and when $M^+$ is other than $H^+$, the terpolymer will be an LMI. Preferably, the low modulus ionomer or acid terpolymer is a terpolymer comprising monomeric units of an α-olefin, a softening agent, such as an acrylate class ester, such as methyl acrylate, n-butyl-acrylate, or iso-butyl-acrylate, and an α,β-unsaturated carboxylic acid, where at least a portion of the acid groups are neutralized by at least one ion in the low modulus ionomer. Preferred low modulus ionomers and acid terpolymers include those having a flexural modulus of from about 500 to about 35,000 psi and a hardness of from about 40 Shore A to about 40 Shore D.

Low modulus ionomers are available commercially from Du Pont under the trade name SURLYN®, such as SUR-LYN® 9320, a copolymer of ethylene-n-butyl acrylate-methacrylic acid neutralized with zinc, and from Exxon under the trade name IOTEK®, typically, a copolymer of ethylene, acrylic acid, and methyl acrylate neutralized with a metal atom. Additionally, the low modulus ionomer compounds useful in the invention can be synthesized by a variety of synthetic routes known to the skilled organic chemist. Acid terpolymers are also available commercially, such as NUCREL® RX9-1, a copolymer of ethylene-n-butyl acrylate-methacrylic acid, available from DuPont. Low modulus ionomers may also be formed by the saponifying terpolymers comprising acrylate or methacryalte esters using methods known in the art, such as those disclosed in U.S. Pat. No. 5,869,578 to Rajagopalan, U.S. Pat. No. 5,218,057 to Kurkov et al., and U.S., Pat. No. 4,638,034 to McClain, the contents of which are incorporated herein by express reference thereto.

A representative base composition for forming at least a portion of a golf ball core prepared in accordance with the present invention comprises polybutadiene as the base rubber, and, in parts by weight based on 100 parts polybutadiene, about 20 to about 50 pph of a metal salt acrylate, such as diacrylate, dimethacrylate, or monomethacrylate, preferably zinc diacrylate. The polybutadiene preferably has a cis 1,4 content of above about 90 percent and more preferably above about 96 percent. However, high trans-polybutadiene may also be used with the present invention. Commercial sources of polybutadiene include SHELL® 1220, manufactured by Shell Chemical, NEOCIS® BR40, manufactured by Enichem Elastomers, and UBEPOL® BR150, manufactured by Ube Industries, Ltd. If desired, the polybutadiene can also be mixed with other elastomers known in the art, such as natural or synthetic rubber, styrene butadiene rubber, and/or isoprene rubber in order to further modify the properties of the core. When a mixture of elastomers is used, the amounts of other constituents in the core composition are based on 100 parts by weight of the total elastomer mixture.

Metal salt diacrylates, dimethacrylates, and monomethacrylates suitable for use in this invention include those wherein the metal is magnesium, calcium, zinc, aluminum, sodium, lithium or nickel. Zinc diacrylate is preferred, because it has been found to provide golf balls with a high initial velocity in the USGA test. The zinc diacrylate can be of various grades of purity. For the purposes of this invention, the lower the quantity of zinc stearate present in the zinc diacrylate, the higher the zinc diacrylate purity. Zinc diacrylate containing less than about 10 percent zinc stearate is preferable. More preferable is zinc diacrylate containing about 4 to about 8 percent zinc stearate. Suitable, commercially available zinc diacrylates include those from Sartomer. The preferred concentrations of zinc diacrylate that can be used are about 20 to about 50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, bis (t-butylperoxy)diisopropylbenzene, 2,5-dimethyl-2,5 di(t-butylperoxy)hexane, or di-t-butyl peroxide, and mixtures thereof. Other useful initiators would be readily apparent to one of ordinary skill in the art without any need for experimentation. The initiator(s) at 100 percent activity are preferably added in an amount ranging between about 0.05 and 2.5 pph based upon 100 parts of polybutadiene, or polybutadiene mixed with one or more other elastomers. More preferably, the amount of initiator added ranges between about 0.15 and 2 pph and most preferably between about 0.25 and 1.5 pph.

A typical golf ball core incorporates 5 to 50 pph of zinc oxide in a zinc diacrylate-peroxide cure system that cross-links polybutadiene during the core molding process. In the present invention, at least one low modulus ionomer or acid terpolymer is added to a golf ball core composition in any amount that imparts the advantageous properties to the core and/or finished ball discussed herein. The low modulus ionomer or acid terpolymer may be present in an amount of about up to about 50 pph of elastomer. Preferably, the low modulus ionomer or acid terpolymer is present in an amount of about 5 to about 45 pph.

The cores and balls having cores produced from such an admixture typically exhibit enhanced performance properties, particularly when the admixture is used to form an outer layer of the core. In particular, the initial velocity of a golf ball is maintained at or near the maximum allowed by the USGA, while the toughness and impact strength of the golf ball core is improved significantly when the core is formed from an elastomer blend containing a low modulus ionomer or acid terpolymer.

It is believed that the durability of the core composition is improved, in part, as a result of the interaction of the free acid groups of the low modulus ionomer or acid terpolymer with the metal ion in the metal salt acrylate, which is believed to be similar to the interaction between the free acid groups and metal ions in ionomers. In addition, it is possible for the metal ions to migrate during the processing of the core compositions of the invention. In particular, the metal ions of the low modulus ionomer may exchange with the metal ions of the metal salt acrylate. This may be referred to as "ion-hopping." As a result, toughness and impact resistance of the cross-linked elastomer is improved, while maintaining a high initial velocity.

The compositions of the present invention may also include fillers, added to the elastomeric composition to adjust the density and/or specific gravity of the core. As used herein, the term "fillers" includes any compound or composition that can be used to vary the density and other properties of the subject golf ball core. Fillers useful in the golf ball core according to the present invention include, for example, zinc oxide, barium sulfate, tin oxide, metals, such as titanium, tungsten, and platinum, hollow glass or ceramic spheres, and regrind (which is recycled core molding matrix ground to 30 mesh particle size). The amount and type of filler utilized is governed by the amount and weight of other ingredients in the composition, since a maximum golf ball weight of 1.620 oz has been established by the USGA. Appropriate fillers generally used range in specific gravity from about 2.0 to 15. Antioxidants may also be included in the elastomer cores produced according to the present invention. Antioxidants are compounds which prevent the breakdown of the elastomer. Antioxidants useful in the present invention include, but are not limited to, quinoline type antioxidants, amine type antioxidants, and phenolic type antioxidants. Other ingredients such as accelerators, peptizers, processing aids, processing oils, plasticizers, foaming agents, dyes and pigments, as well as other additives well known to the skilled artisan may also be used in the present invention in amounts sufficient to achieve the purpose for which they are typically used.

The core compositions of the invention may be produced by forming a mixture comprising at least polybutadiene, zinc diacrylate, and at least one low modulus ionomer or acid terpolymer. In preparing the core blends, when a set of predetermined conditions is met, i.e., time and temperature of mixing, the free radical initiator is added in an amount dependent upon the amounts and relative ratios of the starting components, all of which would be well understood by one of ordinary skill in the art. In particular, as the components are mixed, the resultant shear causes the temperature of the mixture to rise. At least one peroxide free radical initiator is also blended into the mixture to cross-link the core composition during the molding process.

After completion of the mixing, the golf ball core composition is milled and hand prepped or extruded into pieces ("preps") suitable for molding. The milled preps are then compression molded into cores at an elevated temperature. Typically, 160° C. (320° F.) for 15 minutes is suitable for this purpose. These cores can then be used to make finished golf balls by surrounding the cores with mantle and/or cover materials.

The present invention is directed towards not only cores for use in conventional two-piece and wound golf balls, but also to cores for multilayer golf balls as well. In fact, the present invention contemplates that the presently claimed cores can be employed in golf balls of any construction, wherein the construction includes a solid or foamed core, as well as hollow, liquid or gas filled cores.

The cores of the present invention may also comprising highly-neutralized polymers ("HNP") and blends thereof. The acid moieties of the HNP's, typically ethylene-based ionomers, are preferably neutralized greater than about 70%, more preferably greater than about 90%, and most preferably at least about 100%. The HNP's preferably comprise ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably fully neutralized with organic acid copolymers or the salts thereof. The acid copolymers are preferably $\alpha$-olefin, such as ethylene, $C_{3-8}$ $\alpha,\beta$-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylane/methacrylic acid/n-butyl methacrylate, ethylene/acrylic acid/methyl methacrylate, ethylene/acrylic acid/methyl acrylatel, ethylene/methacrylic acid/methyl acrylate, ethylene/methacrylic acid/methyl methacrylate, and ethylene/acrylic acid/n-butyl methacrytate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic accid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl, acrylate, ethylene/(meth)acrylic acid/ethyl acrylate, and ethylene/(meth)acrylic acid/methyl acrylate copolymers.

Ionomers are typically neutralized with a metal cation, such as Li, Na, Mg, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90–100%, most preferably 100% without losing processability. This accomplished by melt-blending an ethylene $\alpha,\beta$-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono-functional (saturated, unsaturated, or multiunsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be partially neutralized with metal cations. The acid moiety in the acid copolymer is neutralized about 1 to about 100%, preferably at least about 40 to about 100%, and more preferably at least about 90 to about 100%, to form an ionomer by a cation such as lithium, sodium, potassium, magneisum, calcium, barium, lead, tin, zinc, aluminum, or a mixture thereof.

The acid copolymers of the present invention are prepared from 'direct' acid copolymers, copolymers polymerized by adding all monomers simultaneously, or by grafting of at least one acid-containing monomer onto an existing polymer.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

The copolyetheresters are comprised of a multiplicity of recurring long chain units and short chain units joined head-to-tail through ester linkages, the long chain units being represented by the formula:

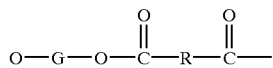

and the short chain units being represented by the formula:

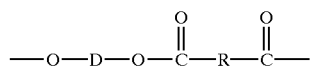

where G is a divalent radical remaining after the removal of terminal hydroxyl groups from a poly (alkylene oxide) glycol having a molecular weight of about 400–8000 and a carbon to oxygen ratio of about 2.0–4.3; R is a divalent radical remaining after removal of hydroxyl groups from a diol having a molecular weight less than about 250; provided said short chain ester units amount to about 15–95 percent by weight of said copolyetherester. The preferred copolyetherester polymers are those where the polyether segment is obtained by polymerization of tetrahydrofuran and the polyester segment is obtained by polymerization of tetramethylene glycol and phthalic acid. For purposes of the invention, the molar ether:ester ratio can vary from 90:10 to 10:80; preferably 80:20 to 60:40; and the Shore D hardness is less than 70; preferably less than about 40.

The copolyetheramides are comprised of a linear and regular chain of rigid polyamide segments and flexible polyether segments, as represented by the general formula:

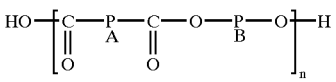

wherein PA is a linear saturated aliphatic polyamide sequence formed from a lactam or amino acid having a hydrocarbon chain containing 4 to 14 carbon atoms or from an aliphatic $C_6$–$C_8$ diamine, in the presence of a chain-limiting aliphatic carboxylic diacid having 4–20 carbon atoms; said polyamide having an average molecular weight between 300 and 15,000; and PB is a polyoxyalkylene sequence formed from linear or branched aliphatic polyoxyalkylene glycols, mixtures thereof or copolyethers derived therefrom, said polyoxyalkylene glycols having a molecular weight of less than or equal to 6000; and n indicates a sufficient number of repeating units so that said polyetheramide copolymer has an intrinsic viscosity of from about 0.6 to about 2.05. The preparation of these polyetheramides comprises the step of reacting a dicarboxylic polyamide, the COOH groups of which are located at the chain ends, with a polyoxyalkylene glycol hydroxylated at the chain ends, in the presence of a catalyst such as a tetra-alkyl ortho titanate having the general formula $Ti(OR)_x$ wherein R is a linear branched aliphatic hydrocarbon radical having 1 to 24 carbon atoms. Again, the more polyether units incorporated into the copolyetheramide, the softer the polymer. The etheramide ratios are as described above for the etherester ratios, as is the Shore D hardness.

The elastomeric polyolefins are polymers composed of ethylene and higher primary olefins such as propylene, hexene, octene, and optionally 1,4-hexadiene and or ethylidene norbomene or norbomadiene. The elastomeric polyolefins can be optionally functionalized with maleic anhydride, epoxy, hydroxy, amine, carboxylic acid, sulfonic acid, or thiol groups.

Thermoplastic polyurethanes are linear or slightly chain branched polymers consisting of hard blocks and soft elastomeric blocks. They are produced by reacting soft hydroxy terminated elastomeric polyethers or polyesters with diisocyanates, such as methylene diisocyanate ("MDI"), p-phenylene diusocyanate ("PPDI"), or toluene diisocyanate ("TDI"). These polymers can be chain extended with glycols, secondary diamines, diacids, or amino alcohols. The reaction products of the isocyanates and the alcohols are called urethanes and these blocks are relatively hard and high melting. These hard high melting blocks are responsible for the thermoplastic nature of the polymrethanes.

Block styrene diene copolymers and their hydrogenated derivatives are composed of polystyrene units and polydiene units. They may also be functionalized with moieties such as OH, $NH_2$, epoxy, COOH, and anhydride groups. The polydiene units are derived from polybutadiene, polyisoprene units or copolymers of these two. In the case of the copolymer it is possible to hydrogenate the polyolefin to give a saturated rubbery backbone segments. These materials are usually referred to as SBS, SIS, or SEBS thermoplastic elastomers and they can also be functionalized with maleic anhydride.

Grafted metallocene-catalyzed polymers are also useful for blending with the HNP's of the present invention. The grafted metallocene-catalyzed polymers, while conventionally neutralized with metal cations, may also be neutralized, either partially for fully, with organic acids or salts thereof and an appropriate base. Grafted metallocene-catalyzed polymers useful, such as those disclosed in U.S. Pat. Nos. 5,703,166; 5,824,746; 5,981,658; and 6,025,442, which are incorporated herein by reference, in the golf balls of the invention are available in experimental quantities from DuPont under the tradenames SURLYN® NMO 525D, SURLYN® NMO 524D, and SURLYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

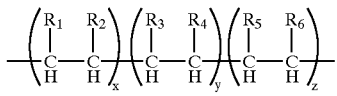

wherein $R_1$ is hydrogen, branched or straight chain alkyl such as methyl, ethyl, propyl, butyl, pentyl, hexyl, heptyl, and octyl, carbocyclic, or aromatic; $R_2$ is hydrogen, lower alkyl including $C_1$–$C_5$; carbocyclic, or aromatic; $R_3$ is hydrogen, lower alkyl including $C_1$–$C_5$, carbocyclic, or aromatic; $R_4$ is selected from the group consisting of H, $C_nH_{2n+1}$, where n=1 to 18, and phenyl, in which from 0 to 5 H within $R_4$ can be replaced by substituents COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$–$C_5$, carbocyclic, or aromatic; $R_6$ is hydrogen, lower alkyl including $C_1$–$C_5$, carbocyclic, or aromatic; and wherein x, y and z are the relative percentages of each co-monomer. X can range from about 1 to 99 percent or more preferably from about 10 to about 70 percent and most preferred, from about 10 to 50 percent. Y can be from 99 to 1 percent, preferably, from 90 to 30 percent, or most preferably, 90 to 50 percent. Z can range from about 0 to about 49 percent. One of ordinary skill in the art would understand that if an acid moiety is present as a ligand in the above polymer that it may be neutralized up to 100% with an organic fatty acid as described above.

Metallocene-catalyzed copolymers or terpolymers can be random or block and may be isotactic, syndiotactic, or atactic. The pendant groups creating the isotactic, syndiotactic, or atactic polymers are chosen to determine the interactions between the different polymer chains making up the resin to control the final properties of the resins used in golf ball covers, centers, or intermediate layers. As will be clear to those skilled in the art, grafted metallocene-catalyzed polymers useful in the invention that are formed from metallocene-catalyzed random or block copolymers or terpolyrners will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or t-butyl; upper alkyl, for example, octyl, nonyl, decyl, and the like; and lower alkylene, for example, ethylene, propylene, butylene, pentene, hexene, octene, norbomene, nonene, decene, and the like.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, and 2,2-methylphenylbutyl.

Non-grafted metallocene-catalyzed polymers useful in the present invention are commercially available under the trade name AFFINITY® polyolefin plastomers and ENGAGE® polyolefin elastomers commercially available from Dow Chemical Company and DuPont-Dow. Other commercially available metallocene-catalyzed polymers can be used, such as EXACT®, commercially available from Exxon and INSIGHT®, commercially available from Dow. The EXACT® and INSIGHT® line of polymers also have novel rheological behavior in addition to their other properties as a result of using a metallocene catalyst technology. Metallocene-catalyzed polymers are also readily available from Sentinel Products Corporation of Hyannis, Mass., as foamed sheets for compression molding.

Monomers useful in the present invention include, but are not limited to, olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester-derivatized mono-carboxylic and dicarboxylic acids, anhydrides of dicarboxylic acids, and cyclic imides of dicarboxylic acids.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers finctionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to a reaction to form a grafted metallocene-catalyzed polymer containing other pendant or functional groups. For example, reaction with water will convert the anhydride to a dicarboxylic acid; reaction with ammonia, alkyl, or aromatic amine forms an amide; reaction with an alcohol results in the formation of an ester; and reaction with base results in the formation of an anionic ionomer.

The HNP's of the present invention may also be blended with single-site and metallocene catalysts and polymers formed therefrom. As used herein, the term "single-site catalyst," such as those disclosed in U.S. Pat. No. 6,150,462 which is incorporated herein by reference, refers to a catalyst that contains an ancillary ligand that influences the stearic and electronic characteristics of the polymerizing site in a manner that prevents formation of secondary polymerizing species. The term "metallocene catalyst" refers to a single-site catalyst wherein the ancillary ligands are comprising substituted or unsubstituted cyclopentadienyl groups, and the term "non-metallocene catalyst" refers to a single-site catalyst other than a metallocene catalyst.

Non-metallocene single-site catalysts include, but are not limited to, the Brookhart catalyst, which has the following structure:

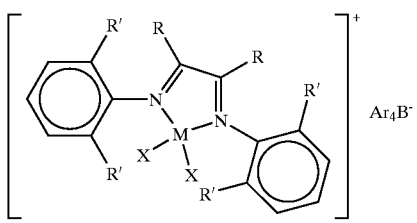

wherein M is nickel or palladium; R and R' are independently hydrogen, hydrocarbyl, or substituted hydrocarbyl; Ar is $(CF_3)_2C_6H_3$, and X is alkyl, methyl, hydride, or halide; the McConville catalyst, which has the structure:

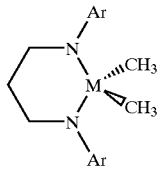

wherein M is titanium or zirconium. Iron (II) and cobalt (II) complexes with 2,6-bis(imino) pyridyl ligands, which have the structure:

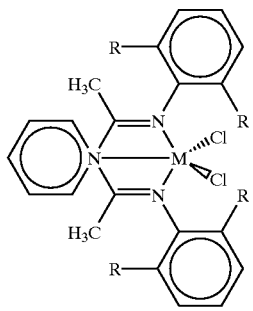

where M is the metal, and R is hydrogen, alkyl, or hydrocarbyl. Titanium or zirconium complexes with pyrroles as ligands also serve as single-site catalysts. These complexes have the structure:

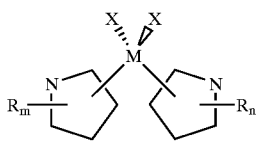

where M is the metal atom; m and n are independently 1 to 4, and indicate the number of substituent groups attached to the aromatic rings; $R_m$ and $R_n$ are independently hydrogen or alkyl; and X is halide or alkyl. Other examples include diimide complexes of nickel and palladium, which have the structure:

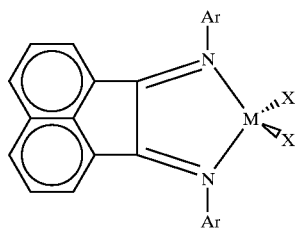

where Ar is aromatic, M is the metal, and X is halide or alkyl. Boratabenzene complexes of the Group IV or V metals also function as single-site catalysts. These complexes have the structure:

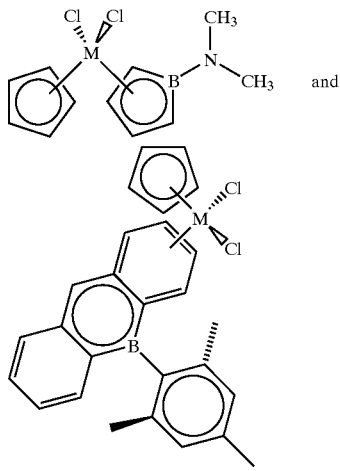

where B is boron and M is the metal atom.

As used herein, the term "single-site catalyzed polymer" refers to any polymer, copolymer, or terpolymer, and, in particular, any polyolefin polymerized using a single-site catalyst. The term "non-metallocene single-site catalyzed polymer" refers to any polymer, copolymer, or terpolymer, and, in particular, any polyolefin polymerized using a single-site catalyst other than a metallocene-catalyst. The catalysts discussed above are examples of non-metallocene single-site catalysts. The term "metallocene catalyzed polymer" refers to any polymer, copolymer, or terpolymer, and, in particular, any polyolefin, polymerized using a metallocene catalyst.

As used herein, the term "single-site catalyzed polymer blend" refers to any blend of a single-site catalyzed polymer and any other type of polymer, preferably an ionomer, as well as any blend of a single-site catalyzed polymer with another single-site catalyzed polymer, including, but not limited to, a metallocene-catalyzed polymer.

The terms "grafted single-site catalyzed polymer" and "grafted single-site catalyzed polymer blend" refer to any single-site catalyzed polymer or single-site catalyzed polymer blend in which the single-site catalyzed polymer has been subjected to a post-polymerization reaction to graft at least one functional group onto the single-site catalyzed polymer. A "post-polymerization reaction" is any reaction that occurs after the formation of the polymer by a polymerization reaction.

The single-site catalyzed polymer, which may be grafted, may also be blended with polymers, such as non-grafted single-site catalyzed polymers, grafted single-site catalyzed polymers, ionomers, and thermoplastic elastomers. Preferably, the single-site catalyzed polymer is blended with at least one ionomer of the preset invention.

Grafted single-site catalyzed polymers useful in the golf balls of the invention may be obtained by subjecting a non-grafted single-site catalyzed polymer to a post-polymerization reaction to provide a grafted single-site catalyzed polymer with the desired pendant group or groups. Examples of single-site catalyzed polymers to which functional groups may be grafted for use in the invention include, but are not limited to, homopolymers of ethylene and propylene and copolymers of ethylene and a second olefin, preferably, propylene, butene, pentene, hexene, heptene, octene, and norbornene. Monomers useful in the present invention include, but are not limited to olefinic monomers having as a functional group sulfonic acid, sulfonic acid derivatives, such as chlorosulfonic acid, vinyl ethers, vinyl esters, primary, secondary, and tertiary amines, epoxies, isocyanates, mono-carboxylic acids, dicarboxylic acids, partially or fully ester derivatized mono-carboxylic and dicarboxylic acids, anhydrides of dicarboxylic acids, and cyclic imides of dicarboxylic acids. Generally, this embodiment of the invention includes golf balls having at least one layer comprising at least one grafted single-site catalyzed polymer or polymer blend, where the grafted single-site catalyzed polymer is produced by grafting a functional group onto a single-site catalyzed polymer having the formula:

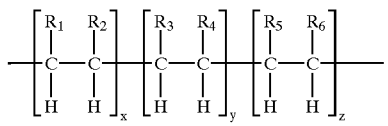

where $R_1$ is hydrogen, branched or straight chain alkyl such as methyl, ethyl, propyl, butyl, pentyl, hexyl, heptyl, and octyl, carbocyclic, aromatic or heterocyclic; $R_2$, $R_3$, $R_5$, and $R_6$ are hydrogen, lower alkyl including $C_1$–$C_5$, carbocyclic, aromatic or heterocyclic; $R_4$ is H, $C_nH_{2n+1}$, where n=1 to 18, and phenyl, in which from 0 to 5 H within $R_4$ can be replaced by substituents such as COOH, $SO_3H$, $NH_2$, F, Cl, Br, I, OH, SH, epoxy, isocyanate, silicone, lower alkyl esters and lower alkyl ethers; also, $R_3$ and $R_4$ can be combined to form a bicyclic ring; and x, y and z are the relative percentages of each co-monomer. X can range from about 1 to about 100 percent or more preferably from 1 to 70 percent and most preferred, from about 1 to about 50 percent. Y can be from about 99 to about 0 percent, preferably, from about 9 to about 30 percent, or most preferably, about 9 to about 50 percent. Z can range from about 0 to about 50 percent. One of ordinary skill in the art would also understand that if an acid group is selected as a ligand in the above structure that it too could be neutralized with the organic fatty acids described above.

The HNP's of the present invention may also be blended with high crystalline acid copolymers and their ionomer derivatives (which may be neutralized with conventional metal cations or the organic fatty acids and salts thereof) or a blend of a high crystalline acid copolymer and its ionomer derivatives and at least one additional material, preferably an acid copolymer and its ionomer derivatives. As used herein, the term "high crystalline acid copolymer" is defined as a "product-by-process" in which an acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to 200° C., at pressures greater than about 20,000 psi preferably greater than about 25,000 psi, more pref. from about 25,000 psi to about 50,000 psi, wherein up to about 70 percent, preferably 100 percent, of the acid groups are neutralized with a metal ion, organic fatty acids and salts thereof, or a mixture thereof. The copolymer can have a melt index ("MI") of from about 20 to about 300 g/10 min, preferably about 20 to about 200 g/10 min, and upon neutralization of the copolymer, the resulting acid copolymer and its ionomer derivatives should have an MI of from about 0.1 to about 30.0 g/10 min.

Suitable high crystalline acid copolymer and its ionomer derivatives compositions and methods for making them are disclosed in U.S. Pat. No. 5,580,927, the disclosure of which is hereby incorporated by reference in its entirety.

The high crystalline acid copolymer or its ionomer derivatives employed in the present invention are preferably formed from a copolymer containing about 5 to about 35 percent, more preferably from about 9 to about 18, most preferably about 10 to about 13 percent, by weight of acrylic acid, wherein up to about 75 percent, most preferably about 60 percent, of the acid groups are neutralized with an organic fatty acid, salt thereof, or a metal ion, such as sodium, lithium, magnesium, or zinc ion.

Generally speaking, high crystalline acid copolymer and its ionomer derivatives are formed by polymerization of their base copolymers at lower temperatures, but at equivalent pressures to those used for forming a conventional acid copolymer and its ionomer derivatives. Conventional acid copolymers are typically polymerized at a polymerization temperature of from at least about 200° C. to about 270° C., preferably about 220° C., and at pressures of from about 23,000 to about 30,000 psi. In comparison, the high crystalline acid copolymer and its ionomer derivatives employed in the present invention are produced from acid copolymers that are polymerized at a polymerization temperature of less than 200° C., and preferably from about 130° C. to about 200° C., and at pressures from about 20,000 to about 50,000 psi.

The HNP's of the present invention may also be blended with cationic ionomers, such as those disclosed in U.S. Pat. No. 6,193,619 which is incorporated herein by reference. In particular, cationic ionomers have a structure according to the formula:

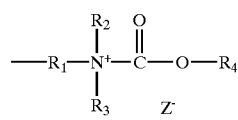

or the formula:

-continued

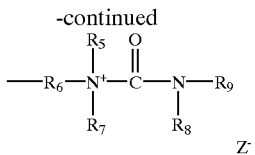

wherein $R_1$–$R_9$ are organic moieties of linear or branched chain alkyl, carbocyclic, or aryl; and Z is the negatively charged conjugate ion produced following alkylation and/or quaternization. The cationic polymers may also be quarternized up to 100% by the organic fatty acids described above.

In addition, such alkyl group may also contain various substituents in which one or more hydrogen atoms has been replaced by a functional group. Functional groups include but are not limited to hydroxyl, amino, carboxyl, amide, ester, ether, sulfonic, siloxane, siloxyl, silanes, sulfonyl, and halogen.

As used herein, substituted and unsubstituted carbocyclic groups of up to about 20 carbon atoms means cyclic carbon-containing compounds, including but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups as described above. The cyclic groups of the invention may further comprise a heteroatom.

The HNP's of the present invention may also be blended with polyurethane and polyurea ionomers which include anionic moieties or groups, such as those disclosed in U.S. Pat. No. 6,207,784 which is incorporated herein by reference. Typically, such groups are incorporated onto the diisocyanate or diisocyanate component of the polyurethane or polyurea ionomers. The anionic group can also be attached to the polyol or amine component of the polyurethane or polyurea, respectively. Preferably, the anionic group is based on a sulfonic, carboxylic or phosphoric acid group. Also, more than one type of anionic group can be incorporated into the polyurethane or polyurea. Examples of anionic polyurethane ionomers with anionic groups attached to the diisocyanate moiety can have a chemical structure according to the following formula:

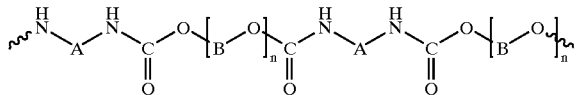

where A=R—$Z^-M^{+x}$; R is a straight chain or branched aliphatic group, a substituted straight chain or branched aliphatic group, or an aromatic or substituted aromatic group; $Z=SO_3^-$; $CO_2^-$; or $HPO_3^-$; M is a group IA, IB, IIA, IIB, IIIA, IIIB, IVA, IVB, VA, VB, VIA, VIB, VIIB or VIIIB metal; x=1 to 5; B is a straight chain or branched aliphatic group, a substituted straight chain or branched aliphatic group, or an aromatic or substituted aromatic group; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Exemplary anionic polyurethane ionomers with anionic groups attached to the polyol component of the polyurethane are characterized by the above chemical structure where A is a straight chain or branched aliphatic group, a substituted straight chain or branched aliphatic group, or an aromatic or substituted aromatic group; B=R—$Z^{-M+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Examples of suitable anionic polyurea ionomers with anionic groups attached to the diisocyanate component have a chemical structure according to the following chemical structure:

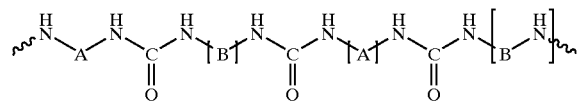

where A=R—$Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and B is a straight chain or branched aliphatic group, a substituted straight chain or branched aliphatic group, or an aromatic or substituted aromatic group. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or $Hf^{+x}$.

Suitable anionic polyurea ionomers with anionic groups attached to the amine component of the polyurea are characterized by the above chemical structure where A is a straight chain or branched aliphatic group, a substituted straight chain or branched aliphatic group, or an aromatic or substituted aromatic group; B=R—$Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; and x=1 to 5. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or $Hf^{+x}$. The anionic polyurethane and polyurea ionomers may also be neutralized up to 100% by the organic fatty acids described above.

The anionic polymers useful in the present invention, such as those disclosed in U.S. Pat. No. 6,221,960 which is incorporated herein by reference, include any homopolymer, copolymer or terpolymer having neutralizable hydroxyl and/or dealkylable ether groups, and in which at least a portion of the neutralizable or dealkylable groups are neutralized or dealkylated with a metal ion.

As used herein "neutralizable" or "dealkylable" groups refer to a hydroxyl or ether group pendent from the polymer chain and capable of being neutralized or dealkylated by a metal ion, preferably a metal ion base. These neutralized polymers have improved properties critical to golf ball performance, such as resiliency, impact strength and toughness and abrasion resistance. Suitable metal bases are ionic compounds comprising a metal cation and a basic anion. Examples of such bases include hydroxides, carbonates, acetates, oxides, sulfides, and the like.

The particular base to be used depends upon the nature of the hydroxyl or ether compound to be neutralized or dealkylated, and is readily determined by one skilled in the art. Preferred anionic bases include hydroxides, carbonates, oxides and acetates.

The metal ion can be any metal ion which forms an ionic compound with the anionic base. The metal is not particularly limited, and includes alkali metals, preferably lithium, sodium or potassium; alkaline earth metals, preferably magnesium or calcium; transition metals, preferably titanium, zirconium, or zinc; and Group III and IV metals. The metal ion can have a +1 to +5 charge. Most preferably, the metal is lithium, sodium, potassium, zinc, magnesium, titanium, tungsten, or calcium, and the base is hydroxide, carbonate or acetate.

The anionic polymers useful in the present invention include those which contain neutralizable hydroxyl and/or dealkylable ether groups. Exemplary polymers include ethylene vinyl alcohol copolymers, polyvinyl alcohol, polyvinyl acetate, poly(p-hydroxymethylene styrene), and p-methoxy styrene, to name but a few. It will be apparent to one skilled in the art that many such polymers exist and thus can be used in the compositions of the invention. In general, the anionic polymer can be described by the chemical structure:

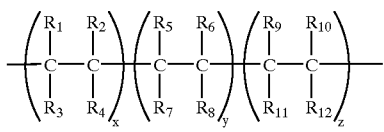

where $R_1$ is OH, OC(O)$R_a$, O—$M^{+V}$, $(CH_2)_nR_b$, $(CHR_z)_nR_b$, or aryl, wherein n is at least 1, $R_a$ is a lower alkyl, M is a metal ion, V is an integer from 1 to 5, $R_b$ is OH, OC(O)$R_a$, O—$M^{+V}$, and $R_z$ is a lower alkyl or aryl, and $R_2$, $R_3$ and $R_4$ are each independently hydrogen, straight-chain or branched-chain lower alkyl. $R_2$, $R_3$ and $R_4$ may also be similarly substituted. Preferably n is from 1 to 12, more preferably 1 to 4.

The term "substituted," as used herein, means one or more hydrogen atoms has been replaced by a functional group. Functional groups include, but are not limited to, hydroxyl, amino, carboxyl, sulfonic, amide, ether, ether, phosphates, thiol, nitro, silane, and halogen, as well as many others which are quite familiar to those of ordinary skill in this art.

The terms "alkyl" or "lower alkyl," as used herein, includes a group of from about 1 to 30 carbon atoms, preferably 1 to 10 carbon atoms.

In the anionic polymers useful in the present invention, at least a portion of the neutralizable or dealkylable groups of $R_1$ are neutralized or dealkylated by an organic fatty acid, a salt thereof, a metal base, or a mixture thereof to form the corresponding anionic moiety. The portion of the neutralizable or dealkylable groups which are neutralized or dealkylated can be between about 1 to about 100 weight percent, preferably between about 50 to about 100 weight percent, more preferably before about 90 to about 100.

Neutralization or dealkylation may be performed by melting the polymer first, then adding a metal ion in an extruder. The degree of neutralization or dealkylation is controlled by varying the amount of metal ion added. Any method of neutralization or dealkylation available to those of ordinary skill in the art may also be suitably employed.

In one embodiment, the anionic polymer is repeating units any one of the three homopolymer units in the chemical structure above. In a preferred embodiment, $R_2$, $R_3$ and $R_4$ are hydrogen, and $R_1$ is hydroxyl, i.e., the anionic polymer is a polyvinyl alcohol homopolymer in which a portion of the hydroxyl groups have been neutralized with a metal base. In another preferred embodiment, $R_2$, $R_3$ and $R_4$ are hydrogen, $R_1$ is OC(O)$R_a$, and $R_a$ is methyl, i.e., the anionic polymer is a polyvinyl acetate homopolymer in which a portion of the methyl ether groups have been dealkylated with a metal ion.

The anionic polymer can also be a copolymer of two different repeating units having different substituents, or a terpolymer of three different repeating units described in the above formula. In this embodiment, the polymer can be a random copolymer, an alternating copolymer, or a block copolymer, where the term "copolymer" includes terpolymers.

In another embodiment, the anionic polymer is a copolymer, wherein $R_5$, $R_6$, $R_7$ and $R_8$ are each independently selected from the group defined above for $R_2$. The first unit of the copolymer can comprise from about 1 to 99 percent weight percent of the polymer, preferably from about 5 to 50 weight percent, and the second unit of the copolymer can comprise from about 99 to 1 weight percent, preferably from about 95 to 50 weight percent. In one preferred embodiment, the anionic polymer is a random, alternating or block copolymer of units (Ia) and (Ib) wherein $R_1$ is hydroxyl, and each of the remaining R groups is hydrogen, i.e., the polymer is a copolymer of ethylene and vinyl alcohol. In another preferred embodiment, the anionic polymer is a random, alternating or block copolymer of units (Ia) and (Ib) wherein $R_1$ is OC(O)$R_5$, where $R_5$ is methyl, and each of the remaining R groups is hydrogen, i.e., the polymer is a copolymer of ethylene and vinyl acetate.

In another embodiment, the anionic polymer is an anionic polymer having neutralizable hydroxyl and/or dealkylable ether groups of as in the above chemical structure wherein $R_{1-9}$ and $R_b$ and $R_z$ are as defined above; $R_{10-11}$, are each independently selected from the group as defined above for $R_2$; and $R_{12}$ is OH or OC(O)$R_{13}$, where $R_{13}$ is a lower alkyl; wherein x, y and z indicate relative weight percent of the different units. X can be from about 99 to about 50 weight percent of the polymer, y can be from about 1 to about 50 weight percent of the polymer, and z ranges from about 0 to about 50 weight percent of the polymer. At least a portion of the neutralizable groups $R_1$ are neutralized. When the amount of z is greater than zero, a portion of the groups $R_{10}$ can also be fully or partially neutralized, as desired.

In particular, the anionic polymers and blends thereof can comprise compatible blends of anionic polymers and ionomers, such as the ionomers described above, and ethylene acrylic methacrylic acid ionomers, and their terpolymers, sold commercially under the trade names SURLYN® and IOTEK® by DuPont and Exxon respectively. The anionic polymer blends useful in the golf balls of the invention can also include other polymers, such as polyvinylalcohol, copolymers of ethylene and vinyl alcohol, poly(ethylethylene), poly(heptylethylene), poly(hexyldecylethylene), poly(isopentylethylene), poly(butyl acrylate), acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polynrethanes, main-chain heterocyclic polymers and poly(furan tetracarboxylic acid diimides), as well as the classes of polymers to which they belong.

The anionic polymer compositions of the present invention typically have a flexural modulus of from about 500 psi to about 300,000 psi, preferably from about 2000 to about 200,000 psi. The anionic polymer compositions typically have a material hardness of at least about 15 Shore A, preferably between about 30 Shore A and 80 Shore D, more preferably between about 50 Shore A and 60 Shore D. The loss tangent, or dissipation factor, is a ratio of the loss modulus over the dynamic shear storage modulus, and is typically less than about 1, preferably less than about 0.01, and more preferably less than about 0.001 for the anionic polymer compositions measured at about 23° C. The specific gravity is typically greater than this about 0.7, preferably greater than about 1, for the anionic polymer compositions. The dynamic shear storage modulus, or storage modulus, of the anionic polymer compositions at about 23° C. is typically at least about 10,000 dyn/cm$^2$.

The golf balls of the present invention may comprise a variety of constructions. In one embodiment of the present invention, golf ball includes a core, an inner cover layer surrounding the core, and an outer cover layer. Preferably, the core is solid.

In a preferred embodiment, the solid core comprises the HNP blend of the present invention. In an alternative embodiment, the solid core may include compositions having a base rubber, a crosslinking agent, a filler, and a co-crosslinking or initiator agent, and the inner cover layer comprises the HNP blend of the present invention.

The base rubber typically includes natural or synthetic rubbers. A preferred base rubber is 1,4-polybutadiene having a cis-structure of at least 40%. More preferably, the base rubber comprises high-Mooney-viscosity rubber. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. The crosslinking agent is present in an amount from about 15 to about 30 parts per hundred of the rubber, preferably in an amount from about 19 to about 25 parts per hundred of the rubber and most preferably having about 20 to 24 parts crosslinking agent per hundred of rubber. The core compositions of the present invention may also include at least one organic or inorganic cis-trans catalyst to convert a portion of the cis-isomer of polybutadiene to the trans-isomer, as desired.

The initiator agent can be any known polymerization initiator which decomposes during the cure cycle. Suitable initiators include peroxide compounds such as dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy) hexane or di-t-butyl peroxide and mixtures thereof.

Fillers, any compound or composition that can be used to vary the density and other properties of the core, typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

The golf ball cores of the present invention may also comprise a variety of constructions. For example, the core may comprise a single layer or a plurality of layers. The core may also comprise a formed of a tensioned elastomeric material. In another embodiment of the present invention, golf ball comprises a solid center surrounded by at least one additional solid outer core layer. The "dual" core is surrounded by a "double" cover comprising an inner cover layer and an outer cover layer.

Preferably, the solid center comprises the HNP blend of the present invention. In another embodiment, the inner cover layer comprises the highly-neutralized acid copolymers of the present invention. In an alternative embodiment, the outer core layer comprises the highly-neutralized acid copolymers of the present invention.

At least one of the outer core layers is formed of a resilient rubber-based component comprising a high-Mooney-viscosity rubber, and a crosslinking agent present in an amount from about 20 to about 40 parts per hundred, from about 30 to about 38 parts per hundred, and most preferably about 37 parts per hundred. It should be understood that the term "parts per hundred" is with reference to the rubber by weight.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball cured polybutadiene material typically has a hardness of at least about 15 Shore A, preferably between about 30 Shore A and 80 Shore D, more preferably between about 50 Shore A and 60 Shore D.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 45 Shore D, preferably less than about 40 Shore D, more preferably between about 25 and about 40 Shore D, and most preferably between about 30 and about 40 Shore D. The casing preferably has a material hardness of less than about 70 Shore D, more preferably between about 30 and about 70 Shore D, and most preferably, between about 50 and about 65 Shore D.

In a preferred embodiment, the intermediate layer material hardness is between about 40 and about 70 Shore D and the outer cover layer material hardness is less than about 40 Shore D. In a more preferred embodiment, a ratio of the intermediate layer material hardness to the outer cover layer material hardness is greater than 1.5.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

In one embodiment, the core of the present invention has an Atti compression of between about 50 and about 90, more preferably, between about 60 and about 85, and most preferably, between about 65 and about 85. In an alternative embodiment, the core has an Atti compression of less than about 50. The overall outer diameter ("OD") of the core is less than about 1.610 inches, preferably, no greater than 1.590 inches, more preferably between about 1.540 inches and about 1.580 inches, and most preferably between about 1.5 inches to about 1.580 inches. The OD of the casing of the golf balls of the present invention is preferably between 1.580 inches and about 1.640 inches, more preferably between about 1.590 inches to about 1.630 inches, and most preferably between about 1.600 inches to about 1.630 inches.

The golf ball of the present invention can have an overall diameter of any size. Although the USGA specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The core compositions of the present invention may also be used in golf equipment, in particular, inserts for golf clubs, such as putters, irons, and woods, and in golf shoes and components thereof.

EXAMPLES

The following non-limiting examples are merely illustrative of the preferred embodiments of the present invention, and are not to be construed as limiting the invention, the scope of which is defined by the appended claims.

Golf ball cores were formed using the golf ball inner core and outer core compositions provided in Table 1. Half shells from the outer core compositions of the control and of the invention were formed, and compression molded around solid, 1.00-inch diameter inner cores formed from the inner core compositions to form 1.58-inch diameter cores. The cores were then covered with an ionomer cover composition having a flexural modulus of about 35,000 to 45,000 psi and a hardness of Shore D 63. The resulting golf balls were tested for COR, initial velocity, and durability.

Although both cores and covered balls in accordance with the invention have a compression that is about 10 points lower than cores and balls that do not incorporate an LMI as an impact modifier in the core, the COR of the cores and the velocity of the balls that incorporate an LMI as an impact modifier are substantially the same as that of the harder cores and balls, which do not incorporate an LMI as an impact modifier. Moreover, the golf balls of the invention are clearly more durable than balls having cores that do not incorporate an LMI as an impact modifier.

TABLE I

| Ingredients | Inner Core Center (weight %) | Outer Core Control (weight %) | Outer Core Invention (weight %) |
|---|---|---|---|
| polybutadiene[1] | 71.54 | 51.88 | 52.55 |
| zinc diacrylate | 8.58 | 24.65 | 24.96 |
| peroxide initiator[2] | 0.58 | — | — |
| peroxide initiator[3] | — | 0.27 | 0.28 |
| peroxide initiator[4] | — | 0.1 | 0.1 |

TABLE I-continued

| Ingredients | Inner Core Center (weight %) | Outer Core Control (weight %) | Outer Core Invention (weight %) |
|---|---|---|---|
| trans-polyisoprene[5] | — | 12.97 | 9.85 |
| SURLYN ® 9320[6] | — | — | 3.28 |
| zinc oxide | 19.3 | 10.13 | 8.98 |
| CORE PROPERTIES | | | |
| Compression | — | 50 | 40 |
| COR[7] | — | 0.769 | 0.757 |
| BALL PROPERTIES | | | |
| Compression | — | 73 | 63 |
| Velocity (ft/s) | — | 251.9 | 251.8 |
| Durability test I[8] | — | 50 | 100 |
| Durability test II[9] | — | 100 | 150 |

[1]SHELL ® Cariflex BR-1220;
[2]VAROX ® 802-40KE-HP;
[3]VAROX ® 231-XL;
[4]DBDB-60;
[5]TP251;
[6]DuPont ionomer; a copolymer of ethylene-n-butyl acrylate-methacrylic acid neutralized with Zn;
[7]COR at 125 ft/s incoming velocity;
[8]Number of hits per ball before first ball failure in 12-ball group; test conducted on finished balls;
[9]Number of hits per ball before 50% ball failure in 12-ball group; test conducted on finished balls.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core and a cover, the cover having a thickness of less than about 0.08 inches, the core having a compression of less than about 90 and is formed from a composition comprising a base rubber, a metal salt acrylate or diacrylate, an initiator, a highly-neutralized polymer, and at least one of a low modulus ionomer or an acid terpolymer of the formula:

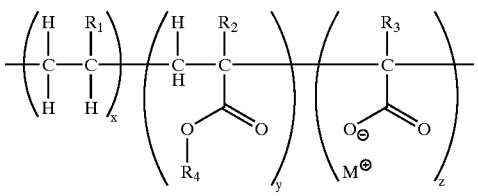

the low modulus iononmer or acid terpolymer having a dynamic shear storage modulus at 23° C. of at least about 104 dynes/cm$^2$ and a loss tangent of no more than about 1 at a frequency of about 1 Hz, wherein $R_1$, $R_2$, and $R_3$ are hydrogen or $CH_3$; $R_4$ is linear or branched alkyl of formula $C_nH_{2n+1}$, where n is an integer; $M^+$ is $H^+$, $Li^+$, $Zn^{2+}$, $Ca^{2+}$, $Ti^{2+}$, $Mg^{2-}$, $Na^+$, $W^{3+}$, or $Zi^{2+}$; and x ranges from about 20 to about 85 weight percent of the polymer, y ranges from about 1 to about 50 weight percent of the polymer, and z ranges from about 1 to about 30 weight percent of the polymer; wherein the low modulus ionomer or acid terpolymer is present in an amount sufficient to improve the durability of the core.

2. The golf ball of claim 1, wherein the cover has a thickness between about 0.02 to about 0.08 inches.

3. The golf ball of claim 1, wherein the cover has a thickness between about 0.02 inches and about 0.05 inches.

4. The golf ball of claim 1, wherein the highly-neutralized polymer comprises ionomeric copolymers and terpolymers, ionomer precursors, polyamides, polycarbonates, polyesters, polynretbanes, polyareas, grafted metallocene-catalyzed polymers, non-grafted metallocene-catalyzed polymers, single-site polymers, high-crystalline acid polymers, cationic ionomers, and mixtures thereof.

5. The golf ball of claim 1, wherein the highly-neutralized polymer comprises an E/X/Y copolymers where E is ethylene, X is an $\alpha,\beta$-ethylenically unsaturated carbaxylic acid, and Y is a softening comonomer.

6. The golf ball of claim 5, wherein X is acrylic or methacrylic acid and Y is a $C_{1-8}$ alkyl acrylate or methacrylate ester.

7. The golf ball of claim 5, wherein X is present in an amount from about 1 to about 35 weight percent of the polymer and Y is present in an amount from about 1 to about 50 weight percent of the polymer.

8. The golf ball of claim 7, wherein X is present in an amount from about 5 to about 30 weight percent of the polymer and Y is present in an amount from about 5 to about 25 weight percent of the polymer.

9. The golf ball of claim 8, wherein X is present in an amount from about 10 to about 20 weight percent of the polymer and Y is present in an amount from about 10 to about 20 weight percent of the polymer.

10. The golf ball of claim 1, wherein the golf ball further comprises an intennediate layer disposed between the core and the cover.

11. The golf ball of claim 10, wherein the intermediate layer comprises a tensioned elastomeric material.

12. The golf ball of claim 1, wherein the core comprises an outer core layer formed of the core composition.

13. The golf ball of claim 1, wherein the low modulus ionomer or acid terpolymer is present in the core blend in an amount of up to about 50 pph based on the weight of the elastomer.

14. The golf ball of claim 1, wherein the low modulus ionomer or acid terpolymer has a flexural modulus of from about 500 to about 35,000 psi and a material hardness of from about 40 Shore A to about 40 Shore D.

15. The golf ball of claim 1, wherein the low modulus ionomer or acid terpolymer is present in the blend in an amount of about 5 to about 45 pph based on the weight of the of elastomer.

16. The golf ball of claim 1, wherein the low modulus ionomer or acid terpolymer comprises monomeric units of an $\alpha$-olefin, a softening agent, and an $\alpha,\beta$-unsaturated carboxylic acid at least partially neutralized by at least one metal ion.

17. The golf ball of claim 16, wherein the softening agent is an acrylate class ester.

18. The golf ball of claim 1, wherein the acrylate class ester is at least one of methyl acrylate, n-butyl-acrylate, or iso-butyl-acrylate.

19. The golf ball of claim 1, wherein the base rubber is cis-polybutadiene, trans-polybutadiene, cis-polyisoprene, trans-polyisoprene, or a blend thereof.

20. The golf ball of claim 1, wherein the core has an Atti compression of between about 50 and about 90.

21. The golf ball of claim 1, wherein the core has an Atti compression of less than about 50.

22. The golf ball of claim 1, wherein the core comprises a center and at least one core layer, and wherein the center is fluid-filled, solid, or hollow.

23. The golf ball of claim 1, wherein the cover comprises an inner cover layer and an outer cover layer.

24. The golf ball of claim 1, wherein the highly-neutralized polymer is neutralized with a metal cation.

25. The golf ball of claim 23, wherein the metal cation comprises Li, Na, Mg, Zn, Ca, and mixtures thereof.

* * * * *